(12) United States Patent
Kuo et al.

(10) Patent No.: US 11,171,713 B2
(45) Date of Patent: Nov. 9, 2021

(54) WIRELESS COMMUNICATION RELAY SYSTEM FOR UNMANNED VEHICLES

(71) Applicant: National Central University, Taoyuan (TW)

(72) Inventors: Chen-Ming Kuo, Taoyuan (TW); Chung-Yue Wang, Taoyuan (TW)

(73) Assignee: National Central University, Taoyuan (TW)

( * ) Notice: Subject to any disclaimer, the term of this patent is extended or adjusted under 35 U.S.C. 154(b) by 226 days.

(21) Appl. No.: 16/687,815

(22) Filed: Nov. 19, 2019

(65) Prior Publication Data

US 2021/0119692 A1    Apr. 22, 2021

(30) Foreign Application Priority Data

Oct. 17, 2019   (TW) .................................. 108137513

(51) Int. Cl.
| | | |
|---|---|---|
| *H04B 7/14* | (2006.01) | |
| *H04B 7/155* | (2006.01) | |
| *G05D 1/00* | (2006.01) | |
| *H04W 4/46* | (2018.01) | |
| *G05D 1/10* | (2006.01) | |

(52) U.S. Cl.
CPC ....... *H04B 7/15592* (2013.01); *G05D 1/0022* (2013.01); *G05D 1/0027* (2013.01); *G05D 1/0088* (2013.01); *G05D 1/10* (2013.01); *H04W 4/46* (2018.02)

(58) Field of Classification Search
CPC ............ H04B 7/15592; H04B 7/18504; H04B 7/15507; G05D 1/0022; G05D 1/0088; G05D 1/10; G05D 1/0027; H04W 4/46; H04W 4/40; G08C 17/02; B64C 39/024; B64C 2201/122; B64C 2201/128; B64C 2201/146
USPC ........................................................ 370/315
See application file for complete search history.

(56) References Cited

U.S. PATENT DOCUMENTS

| | | | | |
|---|---|---|---|---|
| 6,018,659 | A * | 1/2000 | Ayyagari | H04B 7/18504 342/450 |
| 6,108,031 | A * | 8/2000 | King | H04N 13/239 348/118 |
| 9,121,669 | B1 * | 9/2015 | Hyslop | F41G 7/2293 |
| 10,038,492 | B2 * | 7/2018 | Gong | H04W 40/02 |
| 10,139,819 | B2 * | 11/2018 | Hollida | G05D 1/0038 |
| 10,200,109 | B2 * | 2/2019 | Feria | H04L 5/0023 |
| 10,531,505 | B2 * | 1/2020 | Gagne | G01S 19/071 |

(Continued)

FOREIGN PATENT DOCUMENTS

| | | | |
|---|---|---|---|
| CN | 104049625 A | * | 9/2014 |
| CN | 107256032 A | * | 10/2017 |

(Continued)

*Primary Examiner* — Mahendra R Patel
(74) *Attorney, Agent, or Firm* — Demian K. Jackson; Jackson IPG PLLC (57) ABSTRACT

The present invention relates to a wireless communication relay system for an unmanned vehicle includes a control station providing as a console for an implementation of a remote control; an unmanned mission vehicle operated in a first area and receiving the remote control from the control station through a communication link; and an unmanned relay vehicle operated in a second area and in the communication link between the control station and the unmanned mission vehicle.

8 Claims, 4 Drawing Sheets

(56) References Cited

U.S. PATENT DOCUMENTS

| | | | |
|---|---|---|---|
| 2011/0130636 A1* | 6/2011 | Daniel | G08B 21/02 600/301 |
| 2011/0215985 A1* | 9/2011 | Kaplan | H01Q 21/08 343/879 |
| 2014/0111323 A1* | 4/2014 | Strout | B60Q 1/268 340/425.5 |
| 2015/0046014 A1* | 2/2015 | Hesse | B63G 8/42 701/23 |
| 2015/0170524 A1* | 6/2015 | Stefani | G05D 1/0027 701/120 |
| 2015/0346722 A1* | 12/2015 | Herz | G05D 1/0027 701/2 |
| 2016/0254854 A1* | 9/2016 | Wharton | H04B 7/18519 455/12.1 |
| 2016/0360537 A1* | 12/2016 | Palenius | H04W 24/10 |
| 2017/0069214 A1* | 3/2017 | Dupray | G08G 5/0013 |
| 2017/0249792 A1* | 8/2017 | Gennermann | B60R 25/24 |
| 2018/0061243 A1* | 3/2018 | Shloosh | G08G 5/0091 |
| 2019/0281588 A1* | 9/2019 | Zhang | H04W 52/08 |
| 2019/0302798 A1* | 10/2019 | Winkle | G01C 21/20 |
| 2019/0310639 A1* | 10/2019 | Hanson | B63B 39/03 |

FOREIGN PATENT DOCUMENTS

| | | | | |
|---|---|---|---|---|
| CN | 108471604 A | * | 8/2018 | |
| CN | 109032177 A | * | 12/2018 | |
| CN | 109309522 A | * | 2/2019 | |
| WO | WO-2019190644 A1 | * | 10/2019 | G01C 21/20 |

\* cited by examiner

WIRELESS COMMUNICATION RELAY SYSTEM FOR UNMANNED VEHICLES

CROSS-REFERENCE TO RELATED APPLICATION

The present application claims the priority benefit of Taiwan invention patent application serial No. 108137513, dated Oct. 17, 2019, filed in Taiwan intellectual property office. All contents disclosed in the above Taiwan invention patent application is incorporated herein by reference.

FIELD

The present invention relates to a wireless communication relay system for unmanned vehicles, in particular to a wireless communication relay system capable of providing a communication relay that is cross both areas of airspace and waters, airspace and land area, waters and land area or cross three areas of airspace, waters, and land area, for various economic type, a lightweight, or a commercial battery-driven unmanned vehicle.

BACKGROUND

In the prior technology, while drones come across problems, such as, a non-line-of-sight (NLOS) issue, a beyond-line-of-sight (BLOS) issue, or a requirement to extend a communication distance, a communication relay technology is typically applied to resolve these problems. Conventionally, it is used to implement the communication relay through satellite communication in high altitude. By acting as a relay point, a satellite forwards a communication signal from a ground control station to a drone. Nevertheless, an implementation of satellite communication requires to apply for licensing a use permission to the International Telecommunication Union (ITU) in advance, and an installation of a high-power transmitter to generate and send out radio frequency (RF) signals, and only RF band of very high frequency (EHF) in the electromagnetic spectrum from 5 GHz to 40 GHz is available for applicants to use. That is to say, the way to relay communication through is much more suitable for heavyweight drones or military drones flying at relatively high altitude. Usually economic type drones, lightweight drones, or commercial battery-driven drones flying at airspace of low altitude, fail to carry heavy payloads necessary to communicate with satellites and is thus incapable of using a satellite as a communication relay point and implementing satellite communication relay.

Therefore, a different relay scheme particular to drones operating at low altitude airspace that uses one drone acting as a relay point for other drones is developed and proposed based on demands. However, the research and development for the relevant schemes by using drones acting as a communication relay point for drones operating at low altitude airspace are stagnant for a relatively long period and available results are academic researches only. Furthermore, influenced by the practical demands, relevant available researches are focused on two aspects as follows. One research and development aspect is an aerial communication relay between drone to drone flying at airspace area, and the other research and development aspect is a communication relay in waters area by using unmanned surface vehicle acting as a relay point for a remotely operated underwater submarine.

Figure 1:
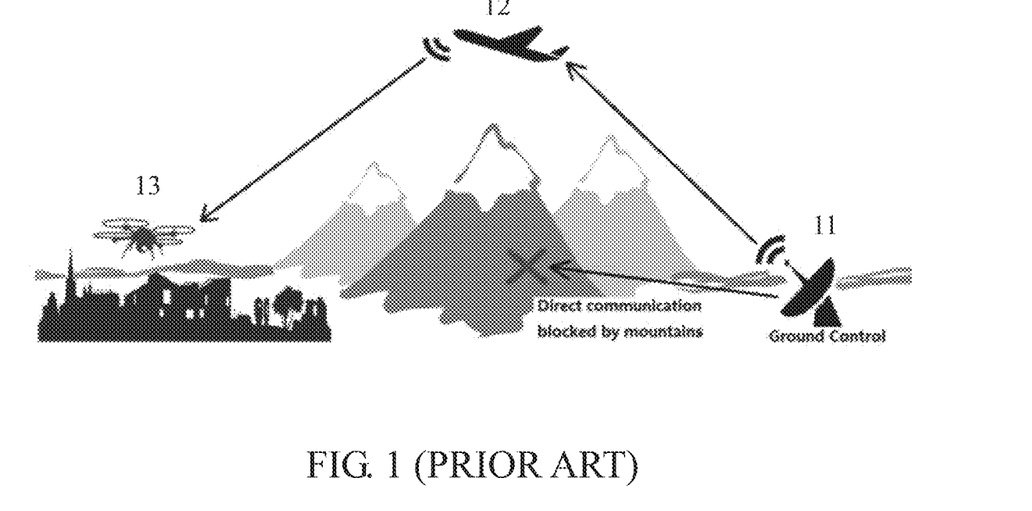
FIG. 1 is a diagram illustrating an implementation of communication relay by using two drones acting as communication relay points to relay a communication signal from and to enable a remote control for controlling aerial drones remotely from a ground control station in prior art.

FIG. 1 is a diagram illustrating an implementation of communication relay by using two drones acting as communication relay points to relay a communication signal from and to enable a remote control for controlling aerial drones remotely from a ground control station in prior art. A group consisting of 5 researchers leaded by Boyang Li, etc. published a research paper entitled as "Development and Testing of a Two-UAV Communication Relay System" on Sensors, Vol. 16, Issue 10, 2016. In the study, it discloses using a drone 12 acting as a communication relay point for the other drone 13, to overcome issues of NLOS, BLOS and extension of communication distance, and enable a remote control to drone 13 from ground control station 11. The entire system disclosed by Boyang Li, etc. is able to fully integrate into an airborne platform. However, the scheme disclosed by Boyang Li, etc. is required a participation of dish antenna and a satellite a, and actually a satellite based communication relay, which is unsuitable for lightweight unmanned aerial vehicles.

Figure 2:
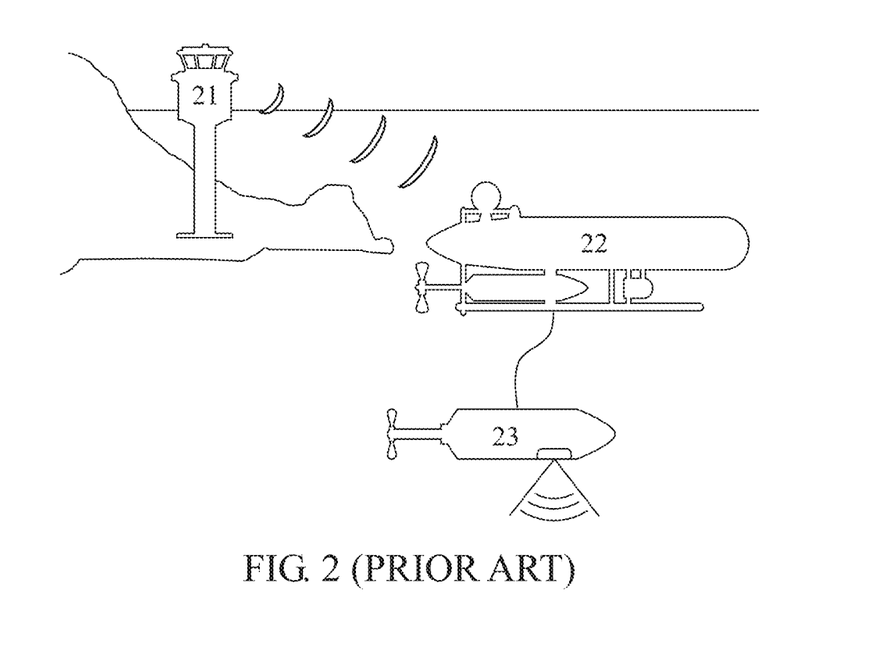
FIG. 2 is a diagram illustrating an implementation of a hybrid communication relay system by configuring an unmanned surface boat acting as a communication relay point to relay a communication signal from and to enable a remote control for controlling a remotely operated underwater vehicle remotely from a ground control station in prior art.

FIG. 2 is a diagram illustrating an implementation of a hybrid communication relay system by configuring an unmanned surface boat acting as a communication relay point to relay a communication signal from and to enable a remote control for controlling a remotely operated underwater vehicle remotely from a ground control station in prior art. A group consisting of 6 researchers leaded by Dong-Wook Jung, etc. published a research paper entitled as "A Study on Unmanned Surface Vehicle Combined with Remotely Operated Vehicle System" on Proceedings of Engineering and Technology Innovation, Vol. 9, pp. 17-24, 2018. In the study, it provides to use an unmanned surface boat 22 acting as a communication relay point to forward a control signal from a ground control station 21 to the remotely operated underwater vehicle 23, between which the unmanned surface boat 22 and the remotely operated underwater vehicle 23 are communicatively linked through a tether cable, to enable a remote control for controlling a remotely operated underwater vehicle remotely from a ground control station.

In brief, in the state of the art, the current communication relay technology is focused on implementing at an airspace area and a waters area, and fails to provide a communication relay that is cross both areas of airspace and waters, airspace and land area, waters and land area or cross three areas of airspace, waters, and land area, for various economic type unmanned vehicle, a lightweight unmanned vehicle, or a commercial battery-driven unmanned vehicle which are operated in a scope of low altitude, a scope of ground surface, a scope of water surface, or a scope of shallow water.

In recent years, an emerging problem regrading an aging and deterioration of waterfront structures, such as: offshore wind turbines, oil platforms, bridges, embankments, lighthouses, dams or harbor structures, has become much urgent and requires to deal with immediately for developed countries. In addition, with and due to the commercial operation for the clean energy, enormous amount of offshore wind turbines is correspondingly constructed all around the world. Above various factors have created lot of demands on a condition check or inspection for these waterfront structures. Such a condition check or inspection usually is usually dangerous and labor intensive, plus with threats from an extreme weather. Thus a most suitable solution for performing these inspection tasks is to jointly use various unmanned vehicle at an airspace area, a waters area and a land area. This kind of hybrid utilization of unmanned vehicle extremely relies on a communication relay technology capable of providing a communication relay that is cross different areas to relay communication signals.

Hence, there is a need to solve the above deficiencies/issues.

SUMMARY

In view of the state of the art, the current technology fails to provide a communication relay that is cross both areas of airspace and waters, airspace and land area, waters and land area or cross three areas of airspace, waters, and land area, for various economic type unmanned vehicle, a lightweight unmanned vehicle, or a commercial battery-driven unmanned vehicle which are operated in a scope of low altitude, a scope of ground surface, a scope of water surface, or a scope of shallow water. Therefore, the present invention provides a system and technology capable of providing a communication relay for the unmanned vehicles by using a plurality of lightweight electric unmanned vehicles operated in different areas as communication nodes and using wire or wireless communication technology in a finite range to establish a communication link between nodes for communication.

The present invention provides a wireless communication relay system for an unmanned vehicle includes a control station providing as a console for an implementation of a remote control; an unmanned mission vehicle operated in a first area and receiving the remote control from the control station through a communication link; and an unmanned relay vehicle operated in a second area and in the communication link between the control station and the unmanned mission vehicle.

Preferably, the unmanned relay vehicle includes an onboard computer including an onboard software which is an open source software opening for a user to access and modify, to allow a transmission and a reception of a signal in both an uplink and a downlink between the control station and the unmanned mission vehicle.

Preferably, the unmanned relay vehicle includes an onboard computer including a communication relay module which is configured to transmit and receive a signal in both an uplink and a downlink between the control station and the unmanned mission vehicle.

Preferably, the first area and the second area are referred to an airspace area, a waters area, or a land area, and the first area is different from the second area.

Preferably, the unmanned mission vehicle and the unmanned relay vehicle are an unmanned ground vehicle, an unmanned aerial vehicle, an unmanned aquatic vehicle, an unmanned aerial ground vehicle, an unmanned ground aquatic vehicle, an unmanned aerial aquatic vehicle, an unmanned aerial ground aquatic vehicle, an unmanned surface vehicle, an unmanned underwater vehicle, or a remotely operated underwater vehicle.

Preferably, the unmanned mission vehicle and the unmanned relay vehicle are driven by an electric power and operated in a scope of low altitude, a scope of ground surface, a scope of water surface, or a scope of shallow water.

Preferably, among the control station, the unmanned mission vehicle and the unmanned relay vehicle, the communication link is established through a wired communication technology or a wireless communication technology to form a local area network, wherein the wired communication technology is a RS485 communication technology, a RS232 communication technology, a RS422 communication technology, an Ethernet communication technology, or a RJ45 communication technology, the wireless communication technology is a Wi-Fi wireless communication technology, a Bluetooth wireless communication technology, a Bluetooth low energy wireless communication technology, a Zigbee wireless communication technology, a Xbee wireless communication technology, a LoRa wireless communication technology, or a Sub-1 GHz wireless communication technology, the local area network is a wired local area network, a wireless local area network, or a hybrid local area network consisting of the wired and the wireless local area network, and the communication link has a communication distance in a range of 100 meter to 500 meter.

The present invention further provides a wireless communication relay system for an unmanned vehicle includes a control station providing as a console for an implementation of a remote control; a first unmanned mission vehicle operated in a first area and receiving the remote control from the control station through a communication link; a second unmanned mission vehicle operated in a second area and receiving the remote control from the control station through a communication link; and an unmanned relay vehicle operated in a third area and in the communication link between the control station to the first unmanned mission vehicle and the third unmanned mission vehicle.

Preferably, the first area, the second area, and the third area are referred to an airspace area, a waters area, or a land area, and two of the first area, the second area, and the third area are different from each other.

The present invention further provides a wireless communication relay system for an unmanned vehicle includes a control station providing as a console for an implementation of a remote control; an unmanned mission vehicle operated in a first area and receiving the remote control from the control station through a communication link; an first unmanned relay vehicle operated in a second area and in the communication link between the control station and the unmanned mission vehicle; and an second unmanned relay vehicle operated in a third area and in the communication link between the unmanned mission vehicle and the first unmanned relay vehicle.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

The unmanned vehicle disclosed in the present invention refers to a remotely operated unmanned vehicle, generally refers to unmanned vehicle operated in a remote end which the unmanned vehicle receives a remote operation from a control station through a wire communication or a wireless communication, and shall at least cover but be not limited to a ground vehicle, an aerial vehicle, an aquatic vehicle, an aerial ground vehicle, a ground aquatic vehicle, an aerial aquatic vehicle, and an aerial ground aquatic vehicle. The unmanned vehicle disclosed in the present invention further refers to but is not limited to, such as, an unmanned aerial vehicle, an unmanned surface vehicle, an unmanned underwater vehicle, a remotely operated underwater vehicle, and an unmanned ground vehicle.

The above mentioned unmanned vehicle is preferably an electric vehicle or a battery-driven vehicle, in particular, an economic type unmanned vehicle, a lightweight unmanned vehicle, or a commercial battery-driven unmanned vehicle, and is operated in a scope of low altitude, a scope of ground surface, a scope of water surface, or a scope of shallow water, wherein the scope of low altitude refers to an airspace lower than an altitude of 400 meters from mean sea level, and the scope of shallow water refers to a waters has a water depth less than 200 meters.

Among respective unmanned vehicles and the control station, a communication link is established through a wired/cabled communication or a wireless communication, and when respective unmanned vehicles are considered as communication nodes, a local area network (LAN) is correspondingly built. As compared to a wide area network (WAN), the LAN refers to a topological pattern of network formed, within an anticipated and finite scope of coverage among all nodes when nodes communicated with each other by using the same or different communication technologies. The LAN is a wired LAN, a wireless LAN, or a hybrid LAN in combination of a wired LAN and a wireless LAN.

The communication technologies appropriate to establish the communication link and LAN are but limited to as follows, for example, in the aspect of wired/cabled communication, a RS485 communication technology, a RS232 communication technology, a RS422 communication technology, an Ethernet communication technology, and a RJ45 communication technology, and in the aspect of wireless communication, a Wi-Fi wireless communication technology, a Bluetooth wireless communication technology, a Bluetooth low energy wireless communication technology, a Zigbee wireless communication technology, a Xbee wireless communication technology, a LoRa wireless communication technology, and a Sub-1 GHz wireless communication technology.

The above LAN is referred to a low-power network, an ad hoc network, or a wireless local area network as well, and referred to a communication network formed within a finite physical range of communication, radius of communication, or a distance of communication, for example, within a distance in range of 100 meters to 500 meters, or within an anticipated and finite distance of communication, among all nodes when nodes communicated with each other by using the same or different communication technologies.

Figure 3:
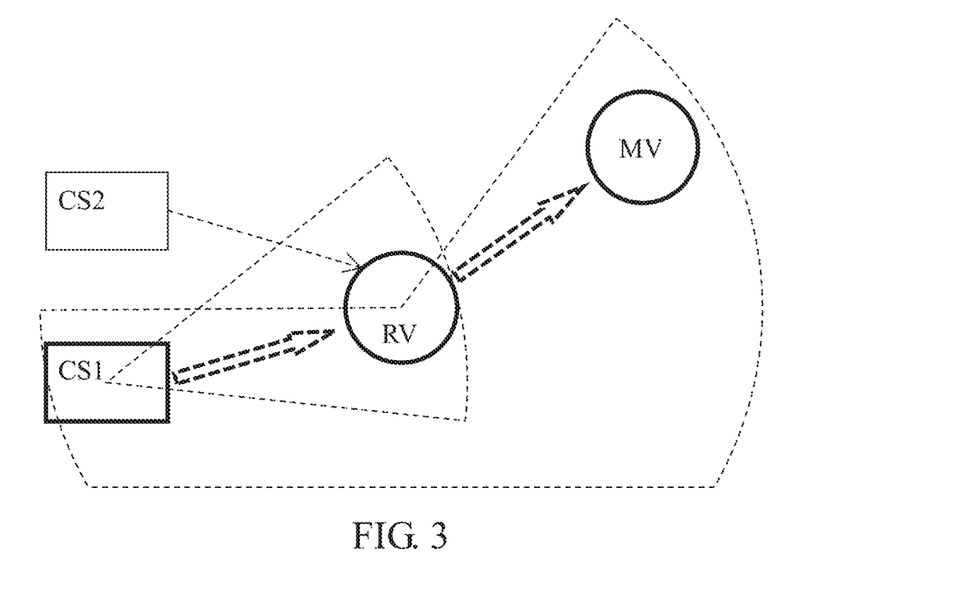
FIG. 3 is a schematic diagram illustrating a system architecture for the communication relay system for unmanned vehicles in accordance with the present invention.

FIG. 3 is a schematic diagram illustrating a system architecture for the communication relay system for unmanned vehicles in accordance with the present invention. The first control station CS1 is used for remote control of an unmanned mission vehicle MV, and it acts as the console for implementing a remote operation. The unmanned mission vehicle MV executes specific missions, such as but not limited to aerial photography, remote sensing, structure inspection, air quality monitoring and so on. When the wireless communication technology is configured between the two nodes of the first control station CS1 and unmanned mission vehicle MV, an appropriate communication link is formed for wireless communication, and a LAN is formed in the wireless communication process. However, due to the occurrence of non-line-of-sight (NLOS) or beyond-line-of-sight (BLOS), for example but not limited to the shading of hills, landform, woods or buildings in the communication line-of-sight (LOS) of the first control station CS1, or the unmanned mission vehicle MV has gone beyond the communication LOS of the first control station CS1, or increasing the communication distance, failing to establish direct wireless communication between the first control station CS1 and the unmanned mission vehicle MV.

The unmanned relay vehicle RV is an unmanned aerial vehicle (UAV) with autopilot function or GPS positioning hover, it can fly to the fixed point automatically according to the preset flight route. Preferably, its onboard computer software is modified, allowing transmitting and receiving the two-way communication signals between the two nodes of the first control station CS1 and unmanned mission vehicle MV, or the onboard computer contains a wireless communication relay module, this wireless communication relay module allows transmitting and receiving the two-way communication signals between the two nodes of the first control station CS1 and unmanned mission vehicle MV. When the unmanned relay vehicle RV is deployed between the two nodes of the first control station CS1 and unmanned mission vehicle MV, and the two nodes of the first control station CS1 and unmanned mission vehicle MV are located in the communication radius of unmanned relay vehicle RV, the unmanned relay vehicle RV acts as a wireless communication relay station between the first control station CS1 and unmanned mission vehicle MV.

The first control station CS1, unmanned relay vehicle RV and unmanned mission vehicle MV can perform wireless communication after the wireless communication technology is configured, and a LAN is formed in the wireless communication process. The unmanned relay vehicle RV receives the encrypted communication signal from the first control station CS1, which is decoded and re-encrypted and forwarded to the unmanned mission vehicle MV, or receives the encrypted communication signal from the unmanned mission vehicle MV, which is decoded and re-encrypted and forwarded to the first control station CS1. The aforementioned wireless communication is implemented preferably by but not limited to single-channel time division multiplexing, and the unmanned relay vehicle RV is able be independently operated by a second control station CS2.

The unmanned mission vehicle MV and unmanned relay vehicle RV are preferably unmanned vehicles operated in different areas, for example, the unmanned mission vehicle MV is an unmanned water surface vehicle operated in aquatic area, or an unmanned ground vehicle operated in ground area, and the unmanned relay vehicle RV is a UAV operated in aerial area.

Figure 4:
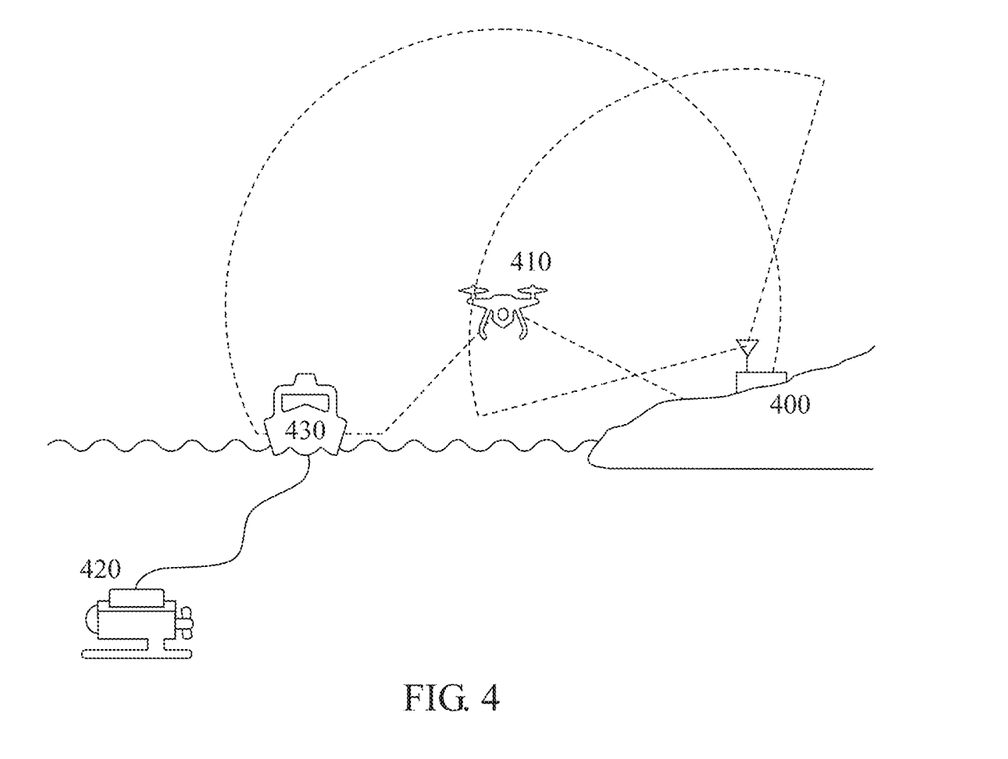
FIG. 4 is a schematic diagram illustrating a first embodiment for the communication relay system for unmanned vehicles in accordance with the present invention.

FIG. 4 is a schematic diagram illustrating a first embodiment for the communication relay system for unmanned vehicles in accordance with the present invention. In the first embodiment, the unmanned relay vehicle is preferably a UAV 410, and the unmanned mission vehicle is preferably a remotely operated unmanned vehicle 420, which are operated in aerial area and aquatic area respectively. In this embodiment, the UAV 410, USV 430 and remotely operated unmanned vehicle 420 can perform communication after an appropriate communication technology is configured, and a topology of network type or mesh type LAN is formed in the communication process.

In this embodiment, a wireless communication is established between UAV 410 and USV 430 by but not limited to Wi-Fi wireless communication technology, a wire communication is established between the remotely operated underwater vehicle 420 and USV 430 by cable connection and through but not limited to RS485 communication interface, receiving the remote operation from USV 430. As the UAV 410, USV 430 and remotely operated underwater vehicle 420 are battery driven electric vehicles, they preferably use radio frequency communication technology with lower power consumption in the communication process, so as to reduce the power consumption in the communication process. The communication range is limited to an expectable and finite distance, even if the remotely operated underwater vehicle 420 establishes communication with USV 430 by wire communication approach, the communication distance is longer than wireless communication, but the communication range is still foreseeable and finite.

As the physical distance between control station 400 and USV 430 has exceeded beyond the LOS of Wi-Fi wireless communication technology, resulting in the BLOS problem, or to deploy the USV 430 on a site farther from the control station 400, the remotely operated underwater vehicle 420 is deployed on a farther site to execute missions, or to increase the physical communication distance between control station 400 and USV 430, the control station 400 cannot establish a direct wireless communication with USV 430.

The UAV 410 is preferably a four-axis rotaplane, with autopilot and GPS positioning hover functions, it is deployed within the wireless communication LOS of control station 400, and within the wireless communication LOS of USV 430, acting as a wireless communication relay station between control station 400 and USV 430. Through the communication link formed of control station 400, UAV 410, USV 430 and remotely operated underwater vehicle 420, the control station 400 can operate the remotely operated underwater vehicle 420 remotely to execute missions.

If a relay station is regarded as a communication relay layer, when the remotely operated underwater vehicle 420 directly receives the remote operation from USV 430, this embodiment is free of the communication relay layer. When the remotely operated underwater vehicle 420 receives remote operation from control station 400 through the communication link formed of control station 400, UAV 410, USV 430 and remotely operated underwater vehicle 420, this embodiment has two layers of communication relay. In this embodiment, the UAV 410 is an unmanned vehicle operated in aerial area, the remotely operated underwater vehicle 420 and USV 430 are unmanned vehicles operated in aquatic area.

Figure 5:
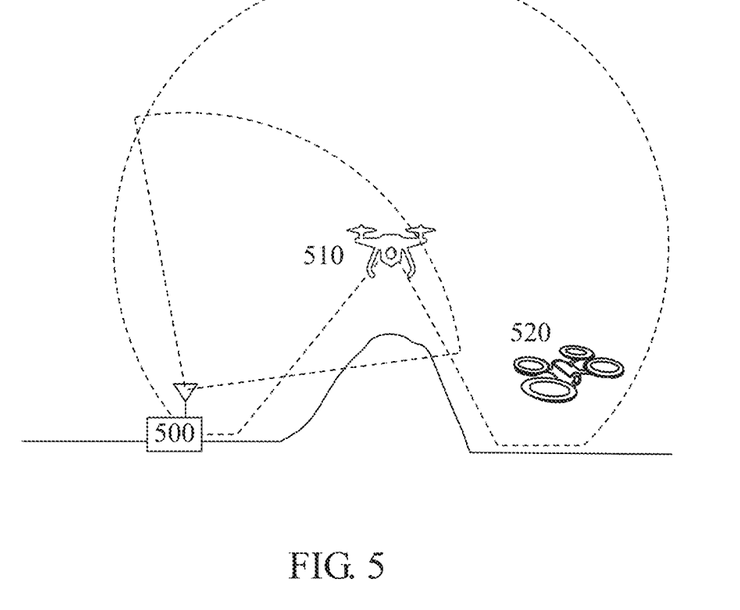
FIG. 5 is a schematic diagram illustrating a second embodiment for the communication relay system for unmanned vehicles in accordance with the present invention.

FIG. 5 is a schematic diagram illustrating a second embodiment for the communication relay system for unmanned vehicles in accordance with the present invention. In the second embodiment, the unmanned relay vehicle is preferably a first UAV 510, and the unmanned mission vehicle is preferably a second UAV 520. However, in this embodiment, the control station 500 is obstructed from the second UAV 520 by a hill, resulting in a NLOS obstacle, so that the two nodes cannot establish a direct wireless communication. A first UAV 510 is deployed between the control station 500 and the second UAV 520 as a wireless communication relay station between the two nodes of control station 500 and the second UAV 520, so that the control station 500 can operate the second UAV 520 remotely to execute missions through the communication link formed of control station 500, the first UAV 510 and the second UAV 520. This embodiment contains one communication relay layer. In this embodiment, the first UAV 510 and the second UAV 520 are unmanned vehicles operated in aerial area.

Figure 6:
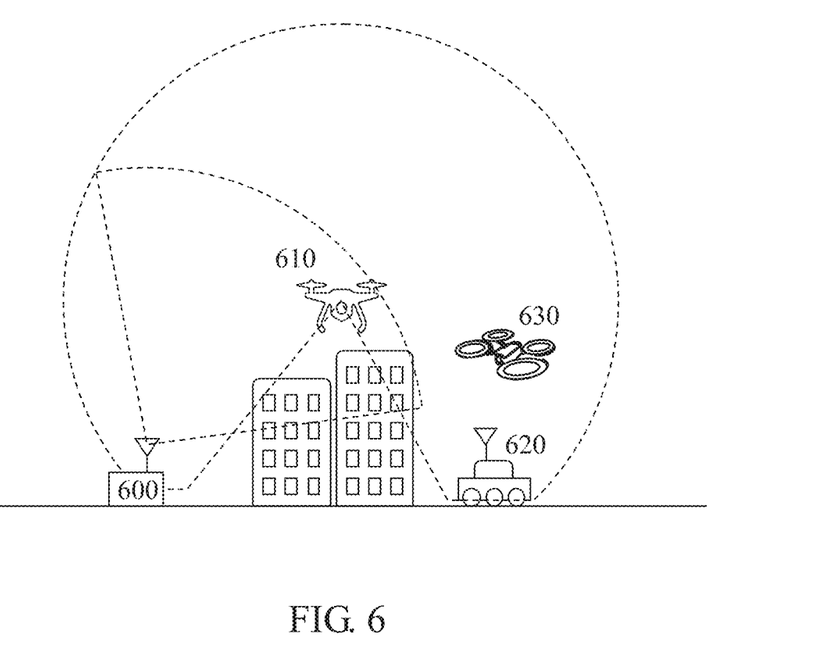
FIG. 6 is a schematic diagram illustrating a third embodiment for the communication relay system for unmanned vehicles in accordance with the present invention.

FIG. 6 is a schematic diagram illustrating a third embodiment for the communication relay system for unmanned vehicles in accordance with the present invention. In the third embodiment, the unmanned relay vehicle is preferably a third UAV 610, there are two unmanned mission vehicles, one is a UGV 620, the other one is a fourth UAV 630, but in this embodiment, the control station 600 is obstructed from the UGV 620 and the fourth UAV 630 by building structures, resulting in a NLOS obstacle between the control station 600 and UGV 620 and the fourth UAV 630, failing to establish a direct wireless communication between the two nodes. At this point, a third UAV 610 is deployed among control station 600 and UGV 620 and the fourth UAV 630 as a wireless communication relay station among the three starlike nodes of control station 600, UGV 620 and the fourth UAV 630, so that the control station 600 can remotely operate UGV 620 and the fourth UAV 630 respectively to execute missions through the communication link formed of control station 600, the third UAV 610 and UGV 620 and through the communication link formed of control station 600, the fourth UAV 630 and the fourth UAV 630. In this embodiment, the third UAV 610 and the fourth UAV 630 are unmanned vehicles operated in aerial area, the UGV 620 is an unmanned vehicle operated in ground area.

Figure 7:
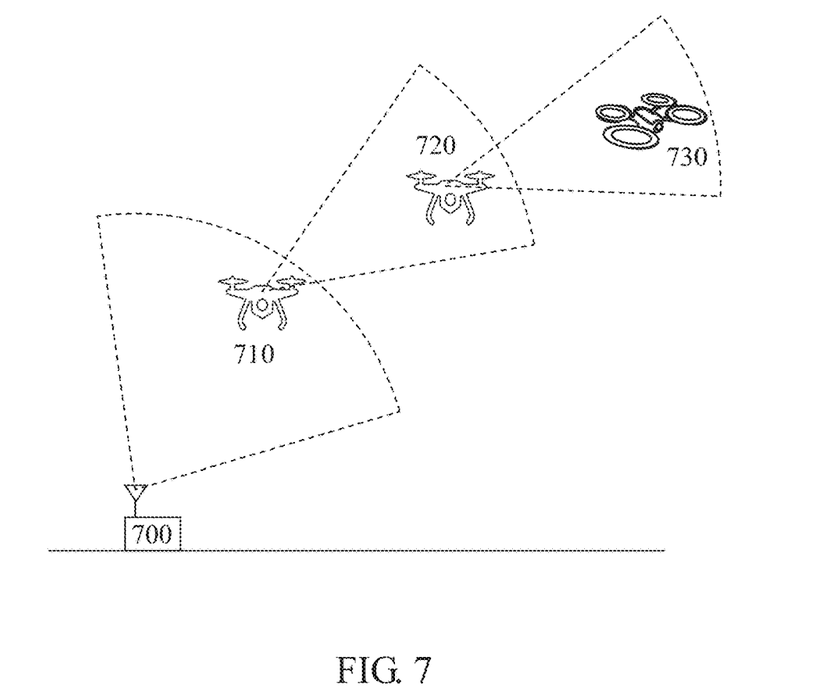
FIG. 7 is a schematic diagram illustrating a multilayer wireless communication relay established by the communication relay system for unmanned vehicles in accordance with the present invention.

FIG. 7 is a schematic diagram illustrating a multilayer wireless communication relay established by the communication relay system for unmanned vehicles in accordance with the present invention. In practical application, an infinite number of communication relay stations is deployed between control station and unmanned mission vehicle, a multilayer wireless relay communication is formed between control station and unmanned mission vehicle. If the unmanned relay vehicles are set as autopilot, and deployed on the planned sites according to GPS positioning, an infinitely extended communication link is easily organized between control station and unmanned mission vehicle, overcoming different possible NLOS obstacles and BLOS obstacles, and the communication distance is extended as possible. As shown in FIG. 7, a fifth UAV 710 and a sixth UAV 720 as two communication relay stations are located between the control station 700 and the seventh UAV 730. In this embodiment, the fifth UAV 710, the sixth UAV 720 and the seventh UAV 730 are unmanned vehicles operated in aerial area.

For the battery driven lightweight unmanned vehicles, commercial unmanned vehicles and general economic unmanned vehicles, due to the limitations of power consumption, payload and low cost, the preferred motion and operating range is within radius of 200 m, 500 m at the farthest, and the 2.4-2.5 GHz and 5.2-5.8 GHz SHF low power consumption radio frequency communication technologies are usually configured for communication, or low power consumption radio frequency communication technology at lower sub-1 GHz UHF and low data rate is used to organize a communication network for communication, heavier or more expensive telecommunication technology is seldom used to organize a communication network, and the communication relay cannot be performed by satellite communication, because the satellite communication requires a high-power transmitter for sending radio frequency signals, and an application for use must be provided to the ITU, and the radio frequency signals are sent through a 5 GHz-40 GHz EHF channel, which cannot be implemented by general battery driven unmanned vehicles.

The communication relay system provided by the present invention preferably provides communication relay for the unmanned vehicles by "taking a plurality of lightweight electric unmanned vehicles operated in different areas as communication nodes and using wire or wireless communication technology in a finite range to establish a communication link between nodes for communication", especially provides communication relay for unmanned vehicles operated in different areas, so as to make up the deficiencies in the present unmanned vehicle technology. The system provided by the present invention is especially applicable to the case requiring multiple unmanned vehicles for executing a mission. The wireless communication relay station is able to be easily and rapidly constructed and deployed by using the communication relay system for unmanned vehicles provided by the present invention, assisting the unmanned vehicles to overcome NLOS obstacle and BLOS obstacle, and the communication distance is extended.

The present invention provides a wireless communication relay for a plurality of lightweight UVs operated in different areas as communication nodes and for a UV system using wired or wireless communication technology in a finite range to establish a communication link between nodes for communication, through modifying the onboard computer software on the UV, which allows the onboard computer software to transmit and receive two-way communication signals between two nodes, so as to provide wireless communication relay for the unmanned vehicle systems taking a plurality of lightweight electric unmanned vehicles operated in different areas as communication nodes and using wire or wireless communication technology in a finite range to establish a communication link between nodes for communication.

Figure 8:
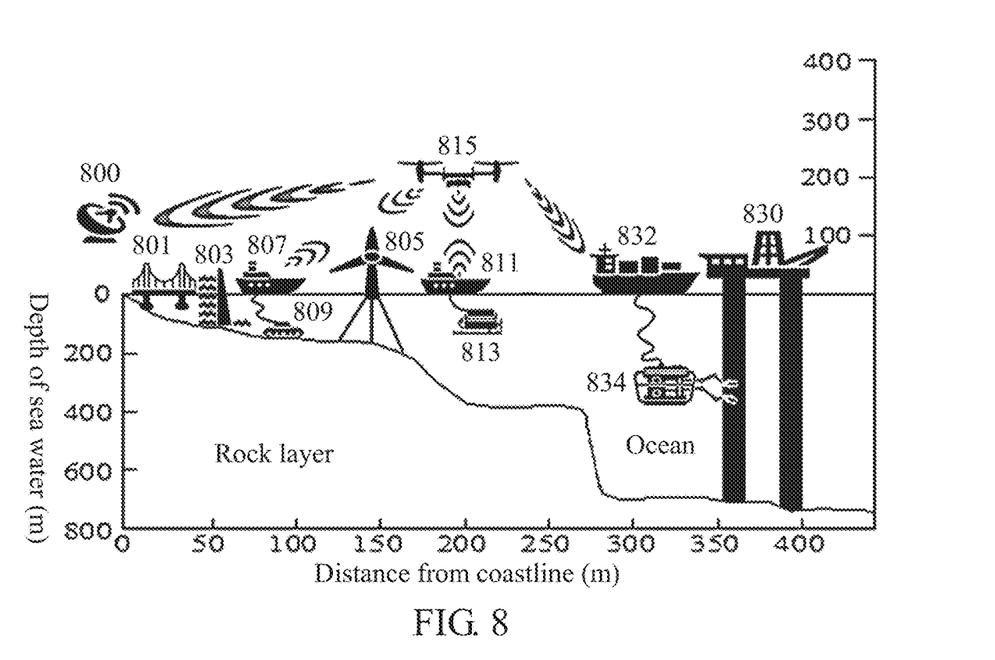
FIG. 8 is a schematic diagram illustrating an application scenario that demonstrates a cross-area communication relay, to which the application scenario the communication relay system for unmanned vehicles in accordance with the present invention is applied.

FIG. 8 is a schematic diagram illustrating an application scenario that demonstrates a cross-area communication relay, to which the application scenario the communication relay system for unmanned vehicles in accordance with the present invention is applied. For a waterfront structure, for example but not limited to an offshore wind turbine, an oil drilling platform, a bridge, an embankment, a lighthouse, a dam or a harbor structure, a part of these structures is usually submerged in water, a part of structure penetrates into batholite, and a part of structure is exposed to weather and upright. Therefore, to inspect these waterfront structures, different kinds of unmanned vehicles, such as aerial vehicles, ground vehicles, water surface vehicles and underwater vehicles, are usually required for joint operation, so as to complete overall inspection of waterfront structures. The inspection process relates to joint operation of unmanned vehicles operated in different areas, and more particularly to joint operation of unmanned vehicles in the mixed area of land, sea and air. The communication relay system for unmanned vehicles provided by the present invention can provide a total solution.

In recent years, the diagnosis and maintenance of the aging and deterioration of waterfront infrastructures and the corresponding reinforcement prolong the service life, and the stream of clean energy initiates the construction of a lot of maritime wind turbines, the inspection of waterfront infrastructures has become a problem the developing countries shall confront actively. For all kinds of factors, the demand for waterfront structure condition inspection grows day by day. However, this kind of inspection is sometimes labor intensive and dangerous work, with the increasingly severe threat of extreme weather, so combining the land, marine and aerial unmanned vehicles for inspection will be the optimum solution.

However, when the land, marine and aerial unmanned vehicles are combined to inspect a waterfront structure jointly, different kinds of unmanned vehicles have different communication technologies and communication distances, and the obstruction of landform and waterfront structures often results in NLOS obstacle and BLOS obstacle and the requirement for increasing the communication distance. The system of the invention is specialized in the problems in the control and communication of different machines in the inspection of waterfront structures, as well as the multilayer space problem in inspection. The system of the present invention can implement actually remote operation and long-distance inspection, it is safe and effective on reducing the overall inspection cost.

As shown in FIG. 8, a bridge 801 and a dam 803 are located at sea level or in the upstream of river, an offshore wind turbine 805 is located on the rock layer of seabed nearby the coastline or the coast (continental shelf), a lightweight water surface vehicle 807 is wire connected and remotely operating a lightweight unmanned underwater tank 809 for inspecting the underwater structures of bridge 801 and dam 803. Another lightweight unmanned ship 811 is wire connected and remotely operating a lightweight remote controlled submarine 813, so as to inspect the underwater structure of offshore wind turbine 805. As the large structure, e.g. bridge 801, dam 803 or offshore wind turbine 805, induces NLOS obstacle to the wireless communication signals from control station 800, or when the offshore wind turbine 805 is too far from the control station 800, there will be BLOS problem to the wireless communication signals from control station 800.

Therefore, an eighth UAV 815 as wireless communication relay station is deployed above the lightweight water surface vehicle 807 and lightweight unmanned ship 811 to provide wireless relay signals for the lightweight water surface vehicle 807 and lightweight unmanned ship 811. The eight UAV 815 is preferably a quadcopter. The control station 800 sends control signals to the lightweight unmanned underwater tank 809 and lightweight remote controlled submarine 813, which are transmitted to the lightweight water surface vehicle 807 and lightweight unmanned ship 811 through the wireless communication relay of the eighth UAV 815, and received and executed by lightweight unmanned underwater tank 809 and lightweight remote controlled submarine 813. The motion range of lightweight water surface vehicle 807, lightweight unmanned underwater tank 809, lightweight unmanned ship 811 and lightweight remote controlled submarine 813 is approximately within 200 m in depth and radius.

An oil drilling platform 830 fixed to the sea-bottom plain is located in the ocean away from continental shelf, a heavy unmanned ship 832 is deployed in proximity to the oil drilling platform 830, wire connected and remotely operating a heavy remote controlled submarine 834, so as to inspect the underwater structure of the oil drilling platform 830. As the heavy unmanned ship 832 is deployed far from the control station 800, a BLOS problem is formed between the control station 800 and heavy unmanned ship 832, one or multiple eighth UAVs 815 as wireless communication relay station are deployed between control station 800 and heavy unmanned ship 832 to provide wireless relay signals for the heavy unmanned ship 832, the control station 800 sends control signal to the heavy remote controlled submarine 834, the signals are transmitted to the heavy unmanned ship 832 through the wireless communication relay of the eighth UAV 815, received and executed by the heavy remote controlled submarine 834. The motion range of heavy unmanned ship 832 and heavy remote controlled submarine 834 is approximately within 200 m to 1000 m in depth and radius.

There are further embodiments provided as follows.

Embodiment 1: A wireless communication relay system for an unmanned vehicle includes a control station providing as a console for an implementation of a remote control; an unmanned mission vehicle operated in a first area and receiving the remote control from the control station through a communication link; and an unmanned relay vehicle operated in a second area and in the communication link between the control station and the unmanned mission vehicle.

Embodiment 2: The wireless communication relay system as described in Embodiment 1, the unmanned relay vehicle includes an onboard computer including an onboard software which is an open source software opening for a user to access and modify, to allow a transmission and a reception of a signal in both an uplink and a downlink between the control station and the unmanned mission vehicle.

Embodiment 3: The wireless communication relay system as described in Embodiment 1, the unmanned relay vehicle includes an onboard computer including a communication relay module which is configured to transmit and receive a signal in both an uplink and a downlink between the control station and the unmanned mission vehicle.

Embodiment 4: The wireless communication relay system as described in Embodiment 1, the first area and the second area are referred to an airspace area, a waters area, or a land area, and the first area is different from the second area.

Embodiment 5: The wireless communication relay system as described in Embodiment 1, the unmanned mission vehicle and the unmanned relay vehicle are an unmanned ground vehicle, an unmanned aerial vehicle, an unmanned aquatic vehicle, an unmanned aerial ground vehicle, an unmanned ground aquatic vehicle, an unmanned aerial aquatic vehicle, an unmanned aerial ground aquatic vehicle, an unmanned surface vehicle, an unmanned underwater vehicle, or a remotely operated underwater vehicle.

Embodiment 6: The wireless communication relay system as described in Embodiment 1, the unmanned mission vehicle and the unmanned relay vehicle are driven by an electric power and operated in a scope of low altitude, a scope of ground surface, a scope of water surface, or a scope of shallow water.

Embodiment 7: The wireless communication relay system as described in Embodiment 1, among the control station, the unmanned mission vehicle and the unmanned relay vehicle, the communication link is established through a wired communication technology or a wireless communication technology to form a local area network, wherein the wired communication technology is a RS485 communication technology, a RS232 communication technology, a RS422 communication technology, an Ethernet communication technology, or a RJ45 communication technology, the wireless communication technology is a Wi-Fi wireless communication technology, a Bluetooth wireless communication technology, a Bluetooth low energy wireless communication technology, a Zigbee wireless communication technology, a Xbee wireless communication technology, a LoRa wireless communication technology, or a Sub-1 GHz wireless communication technology, the local area network is a wired local area network, a wireless local area network, or a hybrid local area network consisting of the wired and the wireless local area network, and the communication link has a communication distance in a range of 100 meter to 500 meter.

Embodiment 8: A wireless communication relay system for an unmanned vehicle includes a control station providing as a console for an implementation of a remote control; a first unmanned mission vehicle operated in a first area and receiving the remote control from the control station through a communication link; a second unmanned mission vehicle operated in a second area and receiving the remote control from the control station through a communication link; and an unmanned relay vehicle operated in a third area and in the communication link between the control station to the first unmanned mission vehicle and the third unmanned mission vehicle.

Embodiment 9: The wireless communication relay system as described in Embodiment 8, the first area, the second area, and the third area are referred to an airspace area, a waters area, or a land area, and two of the first area, the second area, and the third area are different from each other.

Embodiment 10: A wireless communication relay system for an unmanned vehicle includes a control station providing as a console for an implementation of a remote control; an unmanned mission vehicle operated in a first area and receiving the remote control from the control station through a communication link; an first unmanned relay vehicle operated in a second area and in the communication link between the control station and the unmanned mission vehicle; and an second unmanned relay vehicle operated in a third area and in the communication link between the unmanned mission vehicle and the first unmanned relay vehicle.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A wireless communication relay system for an unmanned vehicle, by using a plurality of lightweight electric unmanned vehicles operated in different areas and using a wireless communication technology in a finite range for wireless communication, comprising:
   a control station providing as a console for an implementation of a remote control;
   an unmanned mission vehicle operated in a first area and receiving the remote control from the control station through a communication link; and
   an unmanned relay vehicle operated in a second area that is different from the first area and in the communication link, to provide a communication relay, which is cross the first area and the second area, for the communication link and between the control station and the unmanned mission vehicle,
   wherein the first area and the second area are selected from an airspace area, an underwater area, a water surface area and a land area, and the unmanned mission vehicle and the unmanned relay vehicle are selected from one of the plurality of lightweight electric unmanned vehicles.

2. The wireless communication relay system as claimed in claim 1, wherein the unmanned relay vehicle comprises an onboard computer comprising an onboard software which is an open source software opening for a user to access and modify, to allow a transmission and a reception of a signal in both an uplink and a downlink between the control station and the unmanned mission vehicle.

3. The wireless communication relay system as claimed in claim 1, wherein the unmanned relay vehicle comprises an onboard computer comprising a communication relay module which is configured to transmit and receive a signal in both an uplink and a downlink between the control station and the unmanned mission vehicle.

4. The wireless communication relay system as claimed in claim 1, wherein the unmanned mission vehicle and the unmanned relay vehicle are an unmanned ground vehicle, an unmanned aerial vehicle, an unmanned aquatic vehicle, an unmanned aerial ground vehicle, an unmanned ground aquatic vehicle, an unmanned aerial aquatic vehicle, an unmanned aerial ground aquatic vehicle, an unmanned surface vehicle, an unmanned underwater vehicle, or a remotely operated underwater vehicle.

5. The wireless communication relay system as claimed in claim 1, wherein the unmanned mission vehicle and the unmanned relay vehicle are driven by an electric power and operated in a scope of low altitude, a scope of ground surface, a scope of water surface, or a scope of shallow water.

6. The wireless communication relay system as claimed in claim 1, wherein among the control station, the unmanned mission vehicle and the unmanned relay vehicle, the communication link is established through a wired communication technology or a wireless communication technology to form a local area network, wherein the wired communication technology is a RS485 communication technology, a RS232 communication technology, a RS422 communication technology, an Ethernet communication technology, or a RJ45 communication technology, the wireless communication technology is a Wi-Fi wireless communication technology, a Bluetooth wireless communication technology, a Bluetooth low energy wireless communication technology, a Zigbee wireless communication technology, a Xbee wireless communication technology, a LoRa wireless communication technology, or a Sub-1 GHz wireless communication technology, the local area network is a wired local area network, a wireless local area network, or a hybrid local area network consisting of the wired and the wireless local area network, and the communication link has a communication distance in a range of 100 meter to 500 meter.

7. A wireless communication relay system for an unmanned vehicle, by using a plurality of lightweight electric unmanned vehicles operated in different areas and using a wireless communication technology in a finite range for wireless communication, comprising:
   a control station providing as a console for an implementation of a remote control;
   a first unmanned mission vehicle operated in a first area and receiving the remote control from the control station through a first communication link;
   a second unmanned mission vehicle operated in a second area and receiving the remote control from the control station through a second communication link; and
   an unmanned relay vehicle operated in a third area and in the communication link, to provide a first communication relay cross the first area and the third area for the first communication link and a second communication relay cross the second area and the third area for the second communication link, between the control station to the first unmanned mission vehicle and the second unmanned mission vehicle,
   wherein the first area, the second area and the third area are different from each other and selected from an airspace area, an underwater area, a water surface area and a land area, and the first unmanned mission vehicle, the second unmanned mission vehicle, and the unmanned relay vehicle are selected from one of the plurality of lightweight electric unmanned vehicles.

8. A wireless communication relay system for an unmanned vehicle, by using a plurality of lightweight electric unmanned vehicles operated in different areas and using a wireless communication technology in a finite range for wireless communication, comprising:
   a control station providing as a console for an implementation of a remote control;

an unmanned mission vehicle operated in a first area and receiving the remote control from the control station through a communication link;

an first unmanned relay vehicle operated in a second area and in the communication link, to provide a first communication relay, which is cross the first area and the second area, for the communication link and between the control station and the unmanned mission vehicle; and an second unmanned relay vehicle operated in a third area and in the communication link, to provide a second communication relay, which is cross the first area and the third area, for the communication link and between the unmanned mission vehicle and the first unmanned relay vehicle, wherein the first area, the second area and the third area are different from each other and selected from an airspace area, an underwater area, a water surface area and a land area, and the unmanned mission vehicle, the first unmanned relay vehicle, and the second unmanned relay vehicle are selected from one of the plurality of lightweight electric unmanned vehicles.

\* \* \* \* \*